E. Sullivan
Horse Collar,
No. 3,482. Reissued June 1, 1869.
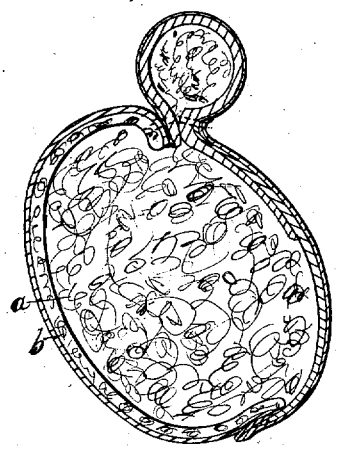
Witnesses:
W. D. Macy.
Jesse Epp.
Inventor:
Eugene Sullivan
By his Attorney
J. C. Robbins
N. PETERS, PHOTO-LITHOGRAPHER, WASHINGTON, D. C.

United States Patent Office.

EUGENE SULLIVAN, OF BOSTON, MASSACHUSETTS, ASSIGNOR TO THE AMERICAN HORSE-COLLAR COMPANY, OF SAME PLACE.

*Letters Patent No.* 79,024, *dated June* 16, 1868; *reissue No.* 3,482, *dated June* 1, 1869.

IMPROVED FABRIC FOR COVERING HORSE-COLLARS.

The Schedule referred to in these Letters Patent and making part of the same.

*To all whom it may concern:*

Be it known that I, EUGENE SULLIVAN, of Boston, in the county of Suffolk, and State of Massachusetts, have invented a new manufacture in the shape of an Improved Horse-Collar; and I do hereby declare that the following is a full and exact description thereof, reference being had to the accompanying sectional drawing of said horse-collar, which forms a portion of this specification.

The distinguishing feature of my said improved horse-collar is the new and improved fibrous and gum impervious fabric that forms the bearing-surface of said collar, a fabric which is produced by the combination of a strong and elastic fibrous material with a layer or coating of vulcanized caoutchouc or gutta-percha, or any other composition containing a sufficient proportion of said gums to produce a smooth, elastic, and durable water-proof surface, substantially like that produced by the said gums, when combined with fibrous fabrics in the usual manner.

The fibrous portion of the said combined fibrous and gum impervious fabric must be composed of wool, or some other elastic material, and must be made of sufficient thickness and strength to enable the same, without additional strengthening, to be smoothly and tenaciously combined with the leather portion of the collar, substantially as shown in the accompanying drawing.

My said new fibrous and gum covering-material must possess a sufficient degree of strength to endure the strain that will be brought upon the same during the operation of stuffing the collar, and afterwards endure all the wear and tear that may be fairly incident to the practical use of the same.

In the accompanying drawing—

*a* is the elastic fibrous portion of my improved fibrous and gum fabric for the bearing-surface of my improved horse-collar, and *b* is the elastic water-proof portion of the same.

The portions of my improved horse-collar that are not particularly described in this specification, may be constructed of any desired materials, and in any manner that may be deemed expedient.

What I claim as my invention, and desire to secure by Letters Patent, is—

The combination of the within-described strong and elastic fibrous fabric with a water-proof layer or coating, composed wholly or in part of vulcanized caoutchouc or gutta-percha.

Also, as a new manufacture, my improved horse-collar, the bearing-surface of which is formed of the within-described strong, elastic, and water-proof fibrous and gum fabric.

EUGENE SULLIVAN.

Witnesses:

JOHN B. FOLGER,

T. J. BRYANT.